No. 619,914. Patented Feb. 21, 1899.
W. T. VENABLE.
MECHANICAL POWER.
(Application filed Feb. 28, 1896.)
(No Model.) 2 Sheets—Sheet 1.
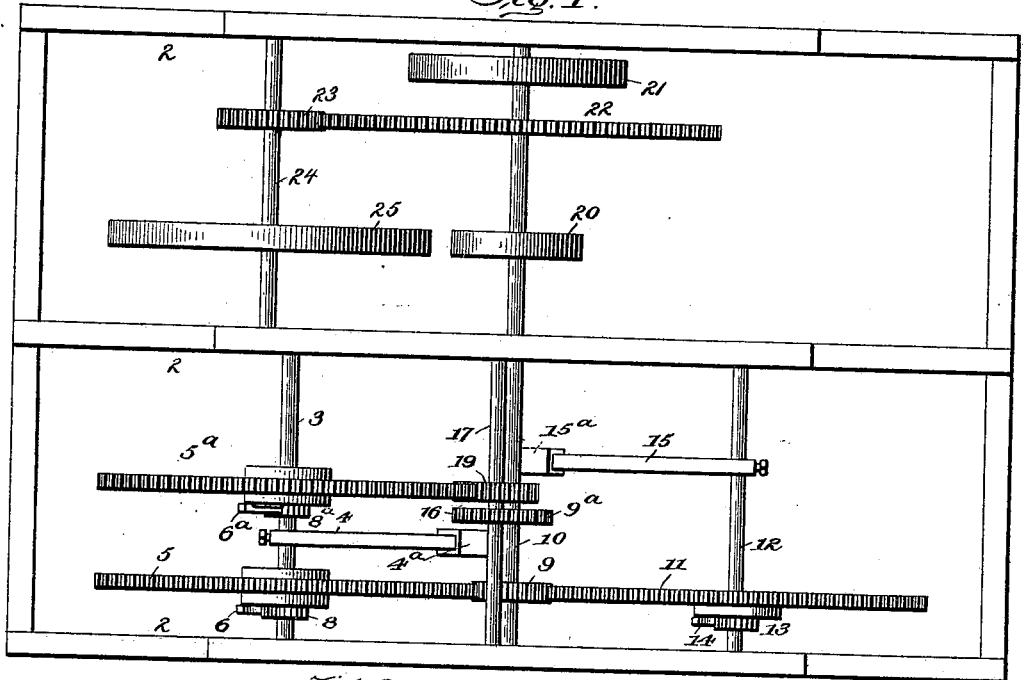
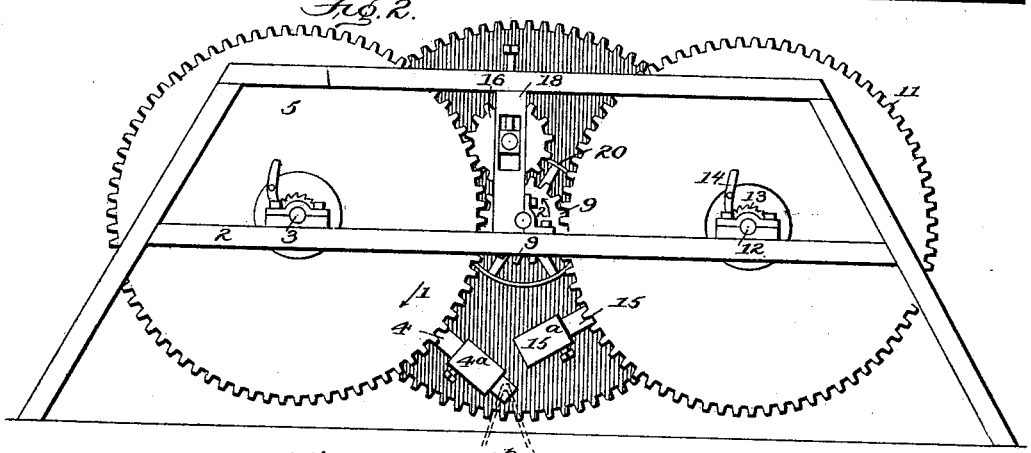
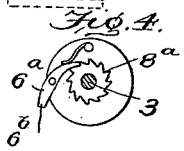
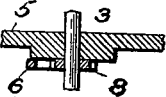
WITNESSES:
Edwin L. Bradford
J. Leon Wilcoxson
INVENTOR
William Tomson Venable No. 619,914. Patented Feb. 21, 1899.
W. T. VENABLE.
MECHANICAL POWER.
(Application filed Feb. 28, 1896.)
(No Model.) 2 Sheets—Sheet 2.
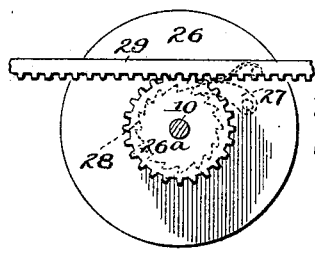
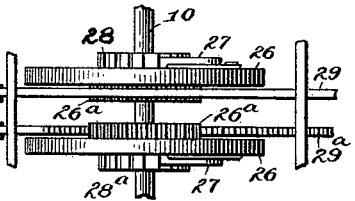
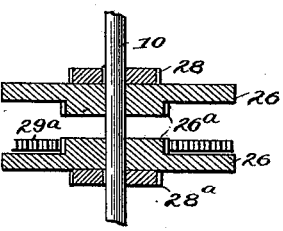
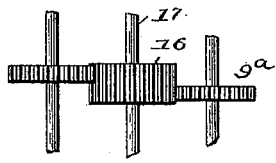
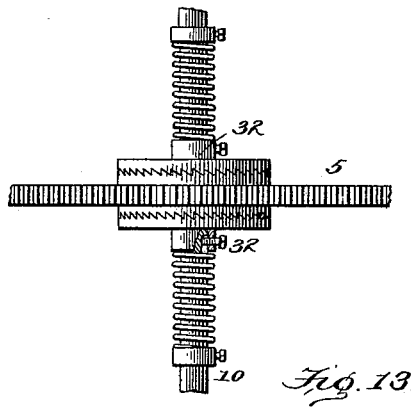
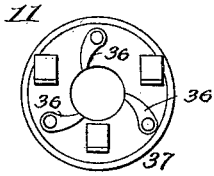
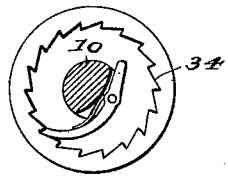
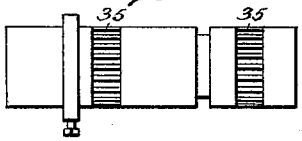
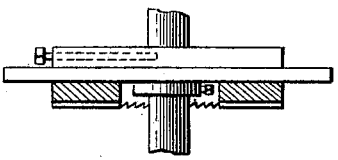
WITNESSES: Edwin L. Bradford, J. Leon Wilcoxson
INVENTOR William Tomson Venable

UNITED STATES PATENT OFFICE.

WILLIAM TOMSON VENABLE, OF CHRISTIANSBURG, KENTUCKY.

MECHANICAL POWER.

SPECIFICATION forming part of Letters Patent No. 619,914, dated February 21, 1899.

Application filed February 28, 1896. Serial No. 581,154. (No model.)

*To all whom it may concern:*

Be it known that I, WILLIAM TOMSON VENABLE, residing at Christiansburg, in the county of Shelby and State of Kentucky, have invented a new and Improved Mechanical Motor, of which the following is a specification.

This invention has for its object to provide a simple and economically-constructed mechanical power whereby a continuous rotary motion is imparted to a drive-shaft by means of an oscillating hand-lever; and it consists in the peculiar combination and novel arrangement of parts, such as will be first described in detail, and then specifically pointed out in the appended claims, reference being had to the accompanying drawings, in which—

Figure 1 is a plan view of the preferred form of my invention. Fig. 2 is an end elevation of the same. Figs. 3 and 4 are detail face views of the pawl-and-ratchet devices used in the machine as illustrated in Fig. 1. Fig. 5 is a cross-section taken on the line 5 5 of Fig. 4. Fig. 6 illustrates a plan view, Fig. 7 a vertical section, and Fig. 8 a transverse section, of a modified arrangement of the clutch-operated mechanism. Fig. 9 illustrates a modified arrangement of the intermediate gears for transmitting motion in one direction to the power-shaft, hereinafter referred to. Figs. 10, 11, 12, 13, and 14 are views of a further modification of the clutch-operating devices, which hereinafter will be described in detail.

In the practical application of my invention in its preferred form, as illustrated in Figs. 1 to 5, inclusive, the same embodies a suitable supporting-frame 1, on the horizontal timbers 2 2 of which is journaled a rock-shaft 3, to which is fixedly but adjustably secured an operating swing-lever 4, which may be provided with an adjustable counterweight $4^a$, as indicated in Fig. 1, or a suspended swing-seat $4^b$, as indicated in Fig. 2, so that an oscillating or swing motion to such lever may be imparted either by hand power or by a swing power when the operator is seated on the seat $4^b$.

On the shaft 3 in one form of clutch mechanism is loosely journaled a pair of large drive-gears 5 $5^a$, the hubs of which carry one or more spring-pawls 6 $6^a$, having springs to normally move them to their engaging position and means (such as cords $6^b$) for holding them when desired to an inoperative position. The gears 5 $5^a$ are properly held on the shaft 3 by means of suitable adjustable washer or disk members 7, and the pawls 6 $6^a$ are adapted to engage with ratchets 8 $8^a$, fixedly held on the shaft 3 by set-screws or other means, and such ratchets and pawls are alternately arranged—*i. e.*, the pawl 6 and ratchet 8 are held to rotate the gear-wheel 5 in one direction as the lever is swung down as the wheel $5^d$ remains inert and the wheel $5^a$ to rotate in a reverse direction on the upward swing of the lever as the wheel 5 is held inert.

The wheel 5 meshes with a cog-gear 9, fixedly mounted on the power-shaft 10, such gearing also meshing with a large cog-wheel 11, held in the same transverse plane with the gear 5, it being of the same diameter as the said gear 5. The gear 11 is loosely mounted on a counter-shaft 12, also journaled on the frame-timbers 2 2, which carries a fixed ratchet 13, engaged by a pawl or pawls 14, secured on the hub of the wheel 11 in such a way as to create a rotation of such wheel 11 reverse to that of the wheel 5. To the shaft 12 is fitted a swinging lever 15, which is also provided with an adjustable weight $15^a$. Upon the shaft 10 is also mounted a second cog-gear $9^a$, the same size as wheel 9, which meshes with a similar cog-gear 16, fixedly secured on a second counter-shaft 17 in vertically-adjustable bearings 18, mounted on the end timbers of the supporting-frame 1, as clearly shown in Fig. 2.

19 indicates a cog-gear, the same size as gears $9^a$ and 16, fixedly held on the shaft 17, which meshes with the large cog-wheel $5^a$.

The power-shaft 10 carries a band-pulley 20 and a fly or balance wheel 21.

To further balance the power-shaft and also to provide for an accumulative speed, such shaft may be provided with a drive cog-wheel 22, of large diameter, arranged to mesh with a pinion 23 on a second drive-shaft 24, journaled on the timbers 2 and $2^a$ and provided with a fly or balance wheel 25.

So far as described, the manner in which my improved power mechanism operates is best explained as follows: Assuming the parts to be in the position shown in Fig. 2, the power being applied to swing the lever 4 in the direction indicated by the arrow, this movement will serve, through the medium of the pawl-and-ratchet devices 6 and 8, to rotate the shaft 3 and the wheel 5 in the direction of the arrow 1, which will rotate gear 9 and shaft 10 in the direction of arrow 2, it being manifest that during this operation the wheel $5^a$ will be turned loosely on shaft 3 in a reverse direction to wheel 5 by the forward rotation of gears on shaft 17, which are thus turned by the gear $9^a$, it being also manifest that the wheel 11 will during the aforesaid operation be rotated loosely on its shaft in the direction indicated by the arrow. When the two levers 4 and 5 and two rock-shafts 3 and 12 are employed, the levers are operated alternately—i. e., after lever 4 has been depressed to its limit of stroke the lever 15 is swung down, causing the wheel 11 to impart a continued forward rotary motion to the power-shaft 10, the wheels 5 and $5^a$ at this time turning loosely on the shaft 3. After the lever 15 has finished its downstroke the lever 4 is raised to rock shaft 3 in a reverse direction, which then locks wheel $5^a$ to turn with it, and in consequence through the shaft 17 and its gears impart a continuation of the forward motion to shaft 10, the wheels 5 and 11 at this time running loose. After this latter movement the lever 15 is raised and the wheel 11 caused to again continue the rotation of shaft 10, wheels 5 and $5^a$ running loose.

While I prefer to use two levers and two rock-shafts, as described, the second or supplemental gear 11 and operating means therefor may be omitted and the continued rotation of shaft 10 effected by the alternate movement of the lever 4. The same result—that is, a continuous revolution to the power-shaft by means of an oscillating or swinging lever—is effected by providing the power-shaft with two loosely-mounted disks 26, having cogged hubs $26^a$, and one or more spring-pawls 27, which are adapted to engage a pair of ratchet-sleeves 28 $28^a$, fixedly held on the shaft 10, the teeth of one sleeve inclining reverse to the teeth of the other sleeve. When this form of clutch mechanism is used, in lieu of the large drive-cogs and intermediate cogs (shown in Figs. 1 and 2) is provided a pair of rack-bars 29 $29^a$, held to slide in suitable guides, one of which is held in engagement with the upper face of the cogged hub of disk 26, while the other engages the under face of the cogged hub of disk $26^a$, and such bars have each a pitman-rod 30 and $30^a$, adjustably connected to the lever 4, as clearly illustrated in Figs. 6, 7, and 8, by reference to which it will readily be seen that the swinging motion of the lever 4 will alternately operate the cogged disks 26 $26^a$ to impart a continuous motion to the shaft 10.

In place of using two gears on the counter-shaft 17, as shown in Fig. 1, the said shaft 17 need have but one gear 16', having its gear-face of sufficient width to engage both the wheel $5^a$ and wheel $9^a$, as shown in Fig. 9.

I desire it understood that various modifications of the clutch devices shown may be made without departing from the general principles of my invention other than those already described. For example, the drive-wheel 5 may have radially-arranged ratchet-teeth on each hub side, the teeth of one side being inclined reverse to those of the other side, which are adapted to engage with clutch-disks 32, held to rotate with the shaft 10, but held spring-pressed against the disk ratchet-faces of the hub, as shown in Fig. 10, so that one clutch will have a slip action, while the other operates to turn the shaft. Again, the hubs of the drive-wheel may have internal ratchet-rims 34, with which pawls held on the drive-shaft 10 are adapted to engage; or the shaft may have ratchet-grooves 35, adapted to be engaged by pawls 36 on the plate 37, held on the shaft 10, and having projections to engage grooves on the said shaft, as shown in Fig. 11; or the clutch members may be arranged as shown in Fig. 14.

The operation of the complete arrangement of the several parts having heretofore been set out a further description of the operation is deemed unnecessary. It should be stated, however, that in all of the several forms of clutch devices the ratchet-wheels are arranged to have a fixed connection with the shaft and are provided with means for lateral adjustment on the said shaft.

The several pawls are all loosely mounted on their axes and have means for normally holding them to an engaging position and to a release position.

Instead of using spur cog-wheels such gears may be in the nature of bevel-cogs, and in lieu of the swinging crank the mechanical equivalent shown may be used.

When the swinging lever-arms are rigidly secured to the parallel rock-shafts in different perpendicular planes, as in Figs. 1 and 2, they can swing toward each other without colliding, and they may be so arranged that when one is reversing its course the other can be in full swing, thus keeping the machinery in constant and uniform motion.

Having thus described my invention, what I claim, and desire to secure by Letters Patent, is—

1. In a mechanism of the character described; the combination with the supporting-frame; a rock-shaft journaled thereon, the drive-wheel loosely mounted on such shaft, and the pawl-and-ratchet devices connecting said wheel and shaft; of a counter rock-shaft having a loosely-mounted drive-wheel and pawl-and-ratchet devices; a power-transmitting shaft having a fixedly-held gear meshing with the two aforesaid drive-wheels and the oppositely-projecting and alternately-operating weighted levers connected to the said rock-shafts, all being arranged substantially as shown and for the purposes described.

2. In a mechanical power as described, in combination; a supporting-frame; a pair of parallelly-arranged rock-shafts mounted thereon; a power-transmitting shaft disposed intermediate of such rock-shafts; one of the rock-shafts having a drive-wheel loosely mounted thereon, and a ratchet-and-pawl device for locking it to move fixedly therewith in one direction; a swing or weight lever connected to such rock-shaft; a pair of drive-wheels of like diameter loosely mounted on the other or second rock-shaft; ratchet-and-pawl mechanism for connecting the said wheels and the second rock-shaft, said mechanisms being alternately arranged whereby one of the said drive-wheels will rotate with the said second shaft as it rocks in one direction and the other wheel when it rocks in a reverse direction, a weight or swing lever secured to the said second shaft and arranged to operate reversely to the weight or swing lever on the other rock-shaft; a supplemental shaft having a gear meshing with one of the pair of drive-wheels on the second shaft, said supplemental shaft having a second gear meshing with the drive-gear on the power-transmitting shaft, said power-transmitting shaft having a drive-gear meshing with the drive-wheel on the first rock-shaft and the adjacent drive-wheel on the second rock-shaft, all being arranged substantially as shown and for the purposes described.

WILLIAM TOMSON VENABLE.

Witnesses:
JAMES ALLIN SMITH,
FRANK FORD.